Feb. 6, 1934.     L. E. JONES     1,946,023
CLEAN-OUT MECHANISM
Filed April 15, 1931
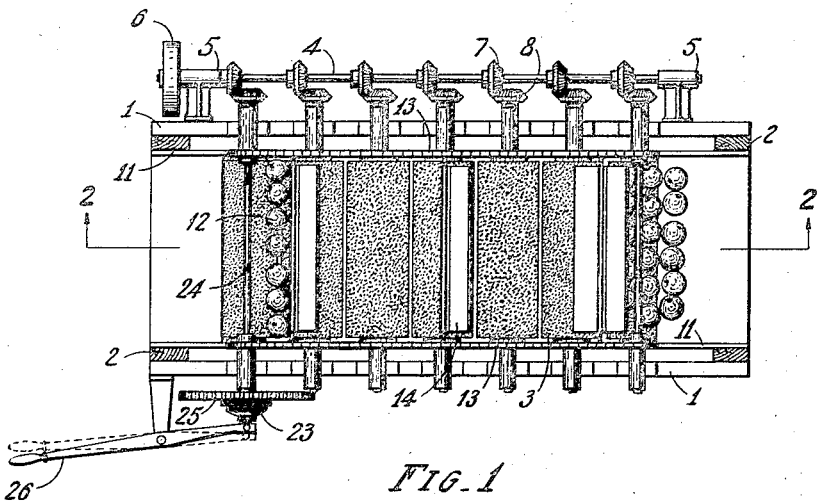
FIG. 1
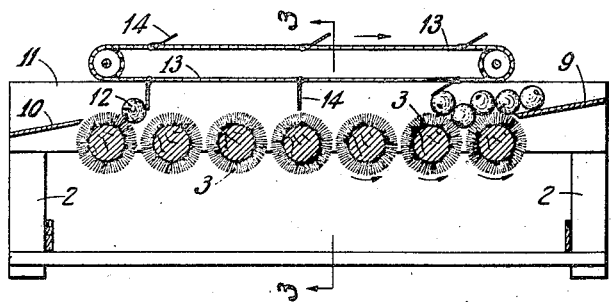
FIG. 2
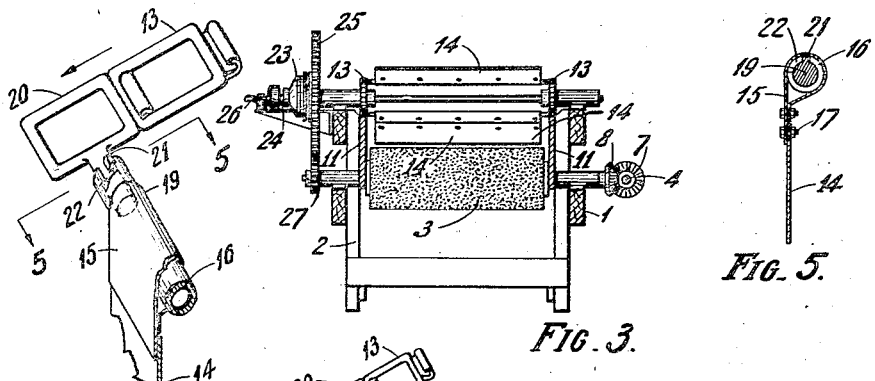
FIG. 3
FIG. 4
FIG. 5
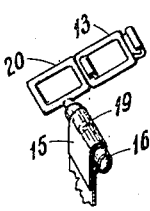
FIG. 6
INVENTOR.
Lloyd. E. Jones.
BY Philip A. Minnis
ATTORNEY Patented Feb. 6, 1934

1,946,023

UNITED STATES PATENT OFFICE 1,946,023

CLEAN-OUT MECHANISM

Lloyd E. Jones, Santa Monica, Calif., assignor to Food Machinery Corporation, San Jose, Calif., a corporation of Delaware Application April 15, 1931. Serial No. 530,395

11 Claims. (Cl. 198-127)

This invention relates to fruit treating mechanism such as may be used in the fruit packing industry to clean, dry or polish fruit, and has particular reference to a mechanism for cleaning out the residual fruit in such an apparatus at the end of its run.

Among the most widely used types of apparatus, such as indicated above, are those machines in which the fruit, while being subjected to treatment, is supported upon and advanced by a series of substantially cylindrical supporting members mounted on fixed axes and arranged in parallel relation so as to form article holding grooves therebetween, all the members being adapted for rotation in a common direction. The supporting members may be provided with bristles for brushing the fruit as it is advanced thereover, or with absorbent means for drying the fruit, or they may be just plain rollers.

In the operation of such machines, as is well known the fruit tends to collect in the grooves between the rotating supporting members where it remains without advancing so long as no additional fruit is fed to the apparatus. Upon additional fruit being fed to the machine, those pieces in the grooves are caused to advance over the tops of the rotating members due to friction with the supporting members, augmented by the urge of oncoming fruit behind. In this manner the fruit is advanced through the machine at a speed determined by the rate the fruit is fed thereto as long as additional fruit continues to be fed. When fruit ceases to be fed, however, the advance also ceases and the fruit in the grooves remains there, since the frictional contact with the supporting members is not in itself sufficient to cause movement of the fruit.

In running successive lots of fruit through such machines it is necessary to keep them separate from each other in order to prevent intermingling of the different lots and thus confusing different kinds of fruit or mixing fruit belonging to one grower with that belonging to another, and to do this it is necessary that each lot be run separately. As pointed out above, however, after the feeding of one run is completed, the advance of the fruit ceases, so that a certain amount remains in the machine and must be cleaned out before the next lot is fed, in order to prevent mixing.

Heretofore it has been the custom to clean out this residual fruit by hand, and in many cases this practice is extremely laborious and consumes a large amount of time, especially where the supporting elements are encased in a housing, as in washing machines or drying apparatus. It may readily be seen that in cases where large numbers of small lots of fruit are being treated, the time lost by delay due to the cleaning out operations necessary after running each lot reaches a considerable amount and it is an object of my invention to prevent this loss by providing a mechanism for performing this step automatically, without the necessity of manual assistance.

Another object is to provide a clean cut mechanism or apparatus of the character described which may be operated to determine the maximum length of time required for the fruit to pass through the machine, while being constructed in such a manner as not to impede the progress of the fruit through the machine when it is desired to pass it through at a greater speed.

Another object is to provide such a clean out mechanism with a variable speed device whereby its speed may be varied or it may be thrown out of operation entirely if desired.

Additional objects and advantages will appear as the description proceeds in connection with the accompanying drawing, wherein like parts are designated by like reference characters throughout the several views.

Figure 1 is a plan view of an apparatus embodying my invention.

Figure 2 is a sectional elevation taken along the lines 2—2 of Figure 1.

Figure 3 is a sectional view taken along the lines 3—3 of Figure 2.

Figure 4 illustrates the manner in which the aprons are mounted on the carrier mechanism, being drawn to a considerably enlarged scale.

Figure 5 is a sectional view taken along the line 5—5 of Figure 4.

Figure 6 illustrates a modified construction of apron mounting in which the apron is mounted in such manner as to be swingable both forwardly and rearwardly.

For the purpose of this disclosure I have shown my invention applied to a brushing machine, and it will be seen that my novel clean out device is positioned above the rotating brushes of such machine and comprises an endless carrier means provided with a series of pivotally mounted depending aprons or baffles, so disposed that they may contact with articles, such as pieces of fruit, resting on the brushes underneath. The operation of the carrier means causes the aprons to be moved slowly over the tops of the brushes in a direction transverse to their axes, so that any fruit resting on the brushes is urged forwardly when contacted by the aprons, and discharged from the machine. In the preferred form of apparatus the pivoted mounting of the aprons is such as to prevent them from swinging rearwardly, while at the same time they are permitted to swing forwardly. In the modified construction the aprons are free to swing rearwardly as well as forwardly. By reason of these constructions the aprons effectively sweep the fruit before them, thus determining the minimum speed of the fruit, but when it is desired to pass fruit through the apparatus at a greater speed than that of the aprons no resistance is offered by the aprons, which yield forwardly and permit the fruit to advance thereunder without interference.

For a more detailed description, reference may now be had to the drawing, wherein the apparatus illustrated comprises a suitable supporting frame 1 provided with legs 2 and carrying a plurality of transversely disposed rotatable brushes 3, all of which are adapted to rotate in the same direction, so that the fruit is advanced across the brushes transversely to their axes.

The driving means for the brushes comprises a drive shaft 4 located to one side of the apparatus and mounted to rotate in bearings 5 secured to the frame 1. Power may be supplied to a suitable pulley 6 keyed to one end of the drive shaft. A plurality of beveled gears 7 are also keyed to the drive shaft and are adapted to mesh with corresponding gears 8, fixed to the outer ends of the brushes' axles. By this construction, when power is applied to the pulley 6, so that the brushes are caused to operate in the direction of the arrows, fruit to be treated may be fed onto the brushes over a suitable ramp 9 and as long as additional fruit continues to be fed it will be advanced transversely across the brushes and finally discharged therefrom over the discharge ramp 10. A pair of guide walls 11 are mounted adjacent the outer ends of the brushes and serve to keep the fruit thereon.

In the operation of the machine thus far described, when pieces of fruit 12 are fed onto the brushes over the ramp 9 they collect in the groove between the first two brushes until the groove is full, whereupon, when any additional pieces are fed their weight against the fruit in the groove operates to advance those pieces with which they contact, which are, thereupon, advanced over the top of the brush into the next groove, the newly fed pieces taking their places. In this manner, as long as the fruit is fed it is continually advanced over the brushes, the speed of advance being determined by the rate the fruit is fed to the brushes. When the supply is stopped, however, the advance stops, so that the fruit in the grooves remains there regardless of the rotating brushes.

Supported by chains 13 at spaced intervals are a series of depending aprons or baffles 14 which, in the preferred form of construction, are pivotally mounted in such manner as to swing forwardly, but not rearwardly. (See Fig. 4.) As illustrated, each apron is provided with an upper extension 15 which is bent back upon itself around a hollow pipe or tube 16 and secured by rivets 17 so as to firmly secure the apron to the pipe 16. The several pipes 16 are supported by suitable pins 19, projecting from certain of the chain links 20 into the open pipe ends. Each pin is provided with a lug 21 which is disposed within a cutaway portion 22 in the end of the pipe, so as to define the rotatable limits of the pipe. The relative positions of the lugs 21 and cutaway portions 22 are such that when the aprons 14 depend vertically the lug prevents them from swinging rearwardly, but permits them to swing forwardly through an arc of approximately 90 degrees. In this manner, as the chains 13 move the aprons in the direction of the arrows, the aprons are adapted to engage pieces of fruit resting on the brushes 3 and sweep them forwardly. If the rate of the advance of the fruit over the brushes should exceed the speed of the aprons, however, due to an increased feeding rate, the aprons may yield forwardly and permit the fruit to pass thereunder, as illustrated at the right in Figure 2.

The aprons 14 may be formed of any suitable material, but I have found it desirable to construct them of some yieldable or resilient material such as leather or rubber, in order to minimize as much as possible the chances of bruising the fruit. The aprons are of such size as to extend substantially the entire width of the runway provided by the side walls 11 and the brushes 3, and their lower edges just clear the upper surfaces of the brushes as they are carried across their tops on their lower path of travel.

The driving means for operating the chains 13, to move the aprons across the brushes, comprises a friction clutch 23 disposed between the shaft 24 and gear 25 and operated by the lever 26. The gear 25 is loosely mounted upon the shaft 24 and meshes with the pinion 27 keyed to the outer extension of the brush axle. By this construction, when the shaft 4 is rotated and the lever 26 is in the position shown in full lines, the shaft 24 is rotated by the gear 25 and the pinion 27, and the clean out mechanism is operated. When the lever 26 is moved to the dotted line position, the clutch 23 is released, whereupon the gear 25 idly rotates on the shaft 24 and the clean out mechanism is idle.

It will also be seen that the speed of the clean out mechanism can be regulated by placing the lever in various positions between the full and dotted line positions shown, thus taking advantage of the degree of slippage of the clutch, which will vary according to the position of the operating lever.

In order to illustrate the operation of the apparatus, let us suppose that it is desired to run several lots of fairly dirty fruit through the machine. Power being applied to the pulley 6, the brushes 3 are all rotated in the direction indicated by the arrows, and with the operating lever 26 in the position shown by full lines the aprons 14 are moved by the carrier mechanism across the tops of the brushes in the direction of movement of their upper surfaces. As the fruit is fed to the brushes over the ramp 9 it will be engaged by the depending aprons 14 which urge it over the brushes toward the discharge end of the machine. On account of the resiliency of the aprons, this action is very gentle, so that there is no danger of damaging the fruit.

Since the passage of fruit over the brushes is not altogether dependent upon the urge of fruit being fed thereto, when the feeding of fruit is discontinued, as when one lot has been entirely fed, there is no opportunity for any residual pieces of fruit to remain in the machine and, consequently, no necessity for cleaning out the machine before beginning to feed the next lot, the cleaning out operation being automatically accomplished by the aprons 14.

As long as fruit continues to be fed at a slower rate than the speed of the aprons it will be seen that the minimum speed of the fruit through the apparatus and, consequently, the maximum amount of brushing it receives, is governed by the speed of the aprons, since the fruit will be urged through the machine at the speed of the aprons regardless of how slowly it may be fed. If it is desired to increase the amount of brushing received by the fruit, it is simply necessary to shift the operating lever 26 slightly, thus decreasing the speed of the aprons. Suppose, however, that one lot of fruit is less dirty than others, so that less brushing is necessary, and it is, therefore, desired to run the fruit over the brushes at a faster rate than the maximum speed of the aprons. In such case it is only necessary to feed the fruit faster than the speed of the aprons, whereupon it will be advanced over the brushes at a rate of speed dependent upon the rate of feeding, without any interference by the aprons since, by reason of their pivoted mounting they will simply be swung forwardly by the advancing fruit which passes thereunder.

In some cases it may be found desirable to dispense with the use of the aprons altogether, which may be done by shifting the lever to the position shown by dotted lines, thus disengaging the clutch 23 and allowing the aprons to remain stationary. The operation of the apparatus will then be as if the aprons were not present, the speed of the passage of the fruit through the machine being entirely governed by the rate of feeding.

Referring to Figure 6 I have illustrated a modified construction of apron mounting wherein the aprons are free to swing rearwardly, as well as forwardly. Such construction may be advisable when particularly gentle handling of the fruit is desired. I have found that such construction operates very satisfactory since only a very slight force is necessary to increase the traction of the fruit against the brushes to the extent necessary to cause its advance over the brushes. The weight of the aprons may be made such that their weight against the fruit supplies the necessary force and by reason of the aprons being freely swingable rearwardly, as well as forwardly, a particularly gentle action results.

Although I have described my invention as applied to a fruit brushing machine, its use is not confined thereto but it is also applicable to other types of machines having other types of supporting means. For example, as heretofore pointed out, the apparatus may be used in connection with mechanism for washing or drying fruit or other articles passing over the supporting elements and the supporting elements may be covered with other materials than bristles, or they may be plain surfaced. It will also be seen that various changes and modifications may be made in the details of the apparatus shown without departing from the spirit of my invention, and I deem myself entitled to all such modifications and variations as fall within the scope of the claims appended hereto.

Having now described my invention and in what manner the same may be used, what I claim as new and desire to protect by Letters Patent is as follows:

1. In an apparatus for treating rollable articles such as fruit and the like, a conveyor over which said articles are normally advanced while undergoing treatment at a speed determined by the rate said articles are fed thereto comprising a plurality of substantially cylindrical supporting elements arranged transversely of the path of said articles and in parallel relation so as to form article holding troughs therebetween, means for rotating said supporting elements in a common direction, said supporting elements being of such proportions relative to the size of articles being conveyed that such articles cannot be urged out of the troughs by the tractive effect of said elements alone but may be displaced therefrom by such tractive effect when augmented by the influence of additional articles deposited therein, a carrier mechanism disposed above the conveyor, a pusher member depending from said carrier mechanism into the path of articles passing over the conveyor and swingably secured thereto for displacement both forwardly and rearwardly to permit the free passage thereunder of articles passing over the conveyor at a speed in excess of that of the pusher member, and to cause the advance of said articles when their speed of advance falls below that of the pusher member by increased traction effected by the pressure of the pusher member passing over said articles, and means for operating the carrier mechanism to move the pusher member along the conveyor.

2. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, article advancing means mounted above said conveyer for operation in the path of articles passing thereover, and driving means therefor, said article advancing means being displaceable forwardly to permit conveyed articles to pass freely therebeneath when their rate of advance over the conveyer exceeds that of the advancing means.

3. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, article advancing means mounted above said conveyer for operation in the path of articles passing thereover, and driving means therefor, said article advancing means being displaceable forwardly to permit conveyed articles to pass freely therebeneath when their rate of advance over the conveyer exceeds that of the advancing means, and means for limiting rearward displacement of said article advancing means whereby the latter is caused to engage and positively advance said articles when their rate of advance over the conveyer falls below that of the article advancing means.

4. In an apparatus for treating rollable articles such as fruit and the like, the combination of a conveyer of the type comprising a series of parallel, substantially cylindrical supporting members arranged for rotation about fixed axes transversely of the path of articles passing thereover, together with means for rotating said supporting members in a common direction, the proportions of said supporting members relative to the size of conveyed articles being such that said articles will not be advanced thereacross by the tractive effect of the supporting members alone, but may be advanced by such tractive effect when augmented by the urge of additional articles delivered to the conveyer, article advancing means mounted above said conveyer for operation in the path of articles passing thereover, and driving means therefor, said article advancing means being freely swingable forwardly to permit the same to be lifted out of the path of articles on the conveyer by engagement with articles therebehind.

5. In an apparatus for treating rollable articles such as fruit and the like, the combination of a conveyer of the type comprising a series of parallel, substantially cylindrical supporting members arranged for rotation about fixed axes transversely of the path of articles passing thereover, together with means for rotating said supporting members in a common direction, the proportions of said supporting members relative to the size of conveyed articles being such that said articles will not be advanced thereacross by the tractive effect of the supporting members alone, but may be advanced by such tractive effect when augmented by the urge of additional articles delivered to the conveyer, article advancing means mounted above said conveyer for operation in the path of articles passing thereover, and driving means therefor, said article advancing means being freely swingable forwardly to permit the same to be lifted out of the path of articles on the conveyer by engagement with articles therebehind, and means for limiting rearward displacement of said article advancing means whereby the latter is caused to positively advance articles forwardly thereof when engaged thereby.

6. In an apapratus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, article advancing means mounted above said conveyer for operation in the path of articles passing thereover, and driving means therefor, said article advancing means being mounted for forward displacement by articles passing over the conveyer at a speed in excess of that of the advancing means, and being operative to engage and advance said articles when their speed falls below that of the article advancing means.

7. In an apparatus for treating rollable articles such as fruit and the like, the combination of a conveyer of the type including a series of parallel substantially cylindrical supporting members arranged for rotation about fixed axes transversely of the path of articles passing thereover, and provided with means for driving the same in a common direction, said supporting members being so proportioned relative to the size of articles being conveyed as to provide a tractive effect insufficient of itself to advance said articles, but sufficient to cause their advance under the urging influence of additional articles being fed to the conveyer, and means for limiting the minimum rate of advance of articles over the conveyer, including a carrier disposed above the conveyer, a pusher associated with said carrier and engageable with articles passing over the conveyer, and means for operating the carrier to move the pusher along the conveyer, said pusher being so mounted as to permit the free passage thereunder of articles passing over the conveyer at a speed in excess of that of the pusher member, and to cause the advance of said articles over the conveyer when their speed of advance falls below that of the pusher.

8. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, a carrier mechanism disposed above the conveyer, a pusher member associated with said carrier mechanism and engageable with articles passing over the conveyer, said pusher member being pivotally secured to said carrier mechanism so that it may swing forwardly to permit the free passage thereunder of articles passing over the conveyer at a speed exceeding that of the pusher member, and means for operating the carrier mechanism to move the pusher member along the conveyer.

9. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, a carrier mechanism disposed above the conveyer, a pusher member associated with said carrier mechanism and engageable with articles passing over the conveyer, said pusher member being pivotally secured to said carrier mechanism so that it may swing forwardly to permit the free passage thereunder of articles passing over the conveyer at a speed exceeding that of the pusher member, means for limiting the rearward swinging movement of said pusher member whereby the latter is caused to positively engage and advance said articles when their rate of advance over the conveyer falls below that of the pusher member, and means for operating the carrier mechanism to move the pusher member along the conveyer.

10. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, article advancing means mounted above said conveyer for operation in the path of articles passing thereover, and driving means therefor, said article advancing means being displaceable both forwardly and rearwardly to permit conveyed articles to pass freely therebeneath when their rate of advance over the conveyer exceeds that of the advancing means, and to cause the advance of said articles when their speed of advance falls below that of the article advancing means by the increased traction effected by the pressure of said article advancing means passing over said articles.

11. In an apparatus for treating rollable articles such as fruit and the like, the combination of a conveyer of the type including a series of substantially cylindrical conveying elements mounted in side by side relation for rotation in a common direction about fixed axes transversely of the path of conveyed articles, and so proportioned relative to the size of conveyed articles that the rate of advance of such conveyed articles is normally dependent upon the rate of feed of additional articles to the conveyer, and means for limiting the minimum rate of advance of articles over the conveyer, including a carrier, a pusher member associated with said carrier and engageable with articles passing over the conveyer, and means for operating the carrier to move the pusher member along the conveyer, said pusher member being swingable both forwardly and rearwardly to permit conveyed articles to pass freely therebeneath when their rate of advance over the conveyer exceeds that of the pusher member, and to cause the advance of said articles when their speed of advance falls below that of the pusher member by the increased traction effected by the pressure of said pusher member passing over said articles.

LLOYD E. JONES.